(No Model.)
W. D. T. TRAVIS.
AXLE BEARING AND HUB.
No. 498,589. Patented May 30, 1893.
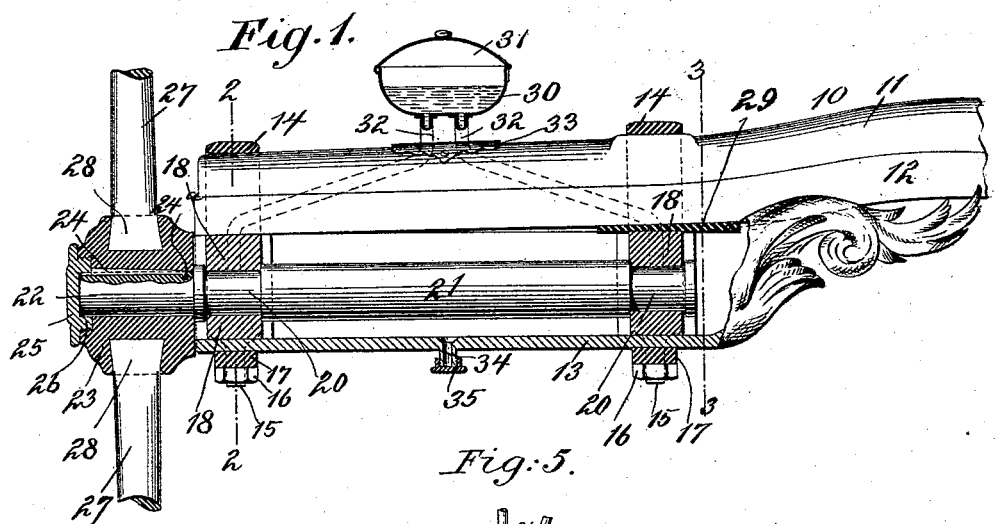
Fig. 1.
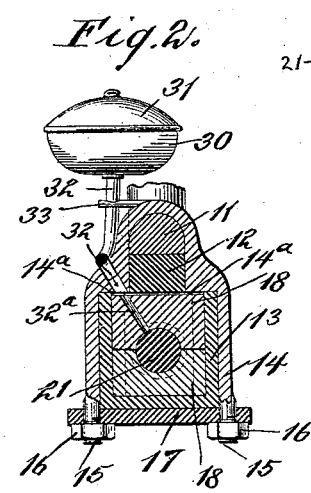
Fig. 2.
Fig. 5.
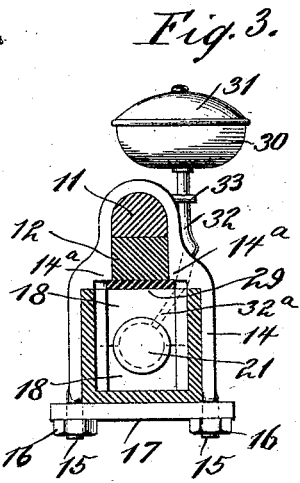
Fig. 3.
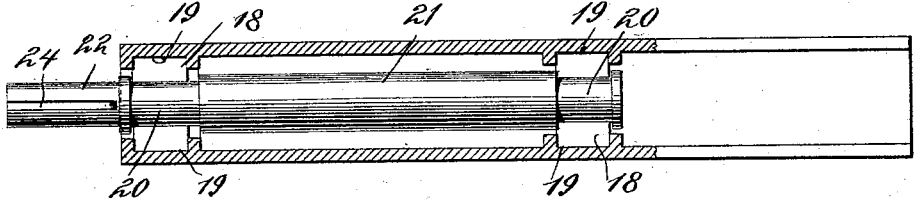
Fig. 4.
WITNESSES:
John A. Rennie
C. Sedgwick
INVENTOR
W. D. T. Travis
BY Munn & Co
ATTORNEYS.

UNITED STATES PATENT OFFICE.

WILLIAM D. T. TRAVIS, OF BURLINGTON, NEW JERSEY.

AXLE-BEARING AND HUB.

SPECIFICATION forming part of Letters Patent No. 498,589, dated May 30, 1893.

Application filed October 12, 1892. Serial No. 448,679. (No model.)

*To all whom it may concern:*

Be it known that I, WILLIAM D. T. TRAVIS, of Burlington, in the county of Burlington and State of New Jersey, have invented a new and Improved Axle-Bearing and Hub, of which the following is a full, clear, and exact description.

My invention relates to improvements in axle bearings and hubs, and an improved connection between the axle bearing and the wheel, and the object of my invention is to produce a comparatively simple and inexpensive bearing which may be readily attached to either a new or an old axle, which is especially adapted to be cheaply applied to an old axle, which is very strong, easy running, self-oiling, and very durable.

To this end, my invention consists in certain features of construction and combinations of parts, which will be hereinafter described and claimed.

Reference is to be had to the accompanying drawings forming a part of this specification, in which similar figures of reference indicate corresponding parts in all the views.

Figure 1 is a longitudinal section of the bearing as applied to an old axle. Fig. 2 is a cross section on the line 2—2 in Fig. 1. Fig. 3 is a cross section on the line 3—3 in Fig. 1. Fig. 4 is a longitudinal section of the shaft chest and axle spindle, showing in detail the construction of both; and Fig. 5 a cross section of the hub.

The bearing is shown applied to an old axle 10, comprising the usual upper wooden member 11, and the lower bottom iron member 12, these being fastened together in the usual way, and the spindle which is usually formed on the iron member 12 is cut off when my improved bearing is attached. The improved bearing is provided with a shaft chest 13, which is held to the under side of the axle 10 by means of clips 14, these clips being exactly like the usual axle clips except that they have shoulders 14$^a$ near the top, which shoulders jut inward over the top of the shaft chest 13, and over the axle bearing boxes so as to hold the chest and boxes firmly in place. The clips 14 have the usual terminal bolts 15, nuts 16, and cross plate 17 which spans the bolts. It will be seen that this form of clip enables the chest 13 to be fastened with great rigidity to the axle.

In opposite end portions of the chest are the two-part boxes 18, which are held in grooves 19 in the chest, see Fig. 4, and these boxes fit snugly upon the reduced portions 20 of the axle spindle 21, which spindle extends longitudinally through the chest and one end 22 protrudes from the end of the chest, this end being reduced and having the metal wheel hub 23 fastened rigidly to it. This fastening is effected by means of a wedge 24, which enters a groove in the spindle, and the wedge is driven in firmly and clinched, its point striking the end of the groove and turning into a slight enlargement 24$^a$, shown clearly in Fig. 1. The outer end of the hub is provided with a cap 25, which has an inwardly-extending flange 26 which fits in a recess in the end of the hub, and is screw threaded so as to be turned into the hub. This cap is more for ornament than for use, as the wedge 24 serves to bind the hub in place. The hub has the usual spokes 27 therein, these having their inner ends 28 dovetailed into the hub and wedged in with white lead. As the hub turns with the axle it is made short, and is given a comparatively large circumference in which sockets 28$^a$ are produced to receive the spokes, and the metal between the sockets serves to brace the spokes.

Between the inner boxes 18 and the bottom of the axle 10, is a wedge 29, and by adjusting this wedge in relation to the axle, the chest 13 and the spindle 21 may be regulated so as to give the wheel the proper pitch in relation to the axle. On the top of the axle and above the oil chest is an oil cup 30, having preferably a swinging lid 31, although any kind of a cup may be used, and opening from the bottom of the cup are pipes 32 which are supported in a plate 33 on the axle, and these pipes diverge and deliver into oil ducts 32$^a$, see Fig. 2, and the ducts are produced in the upper boxes 18 and deliver upon the bearing portions 20 of the spindle. Any excess of oil which oozes from the bearing is caught in the shaft chest 13, and this chest is provided with a vent 34 at the bottom, which is closed by a screw-cap 35, so that when a quantity of oil accumulates in the chest it may be readily withdrawn through the vent. If desired, the oil cup and ducts may be dispensed with, and the chest 13 used as an oil chest, in which sufficient oil may be placed to lubricate the bearing for a long time.

The spindle 21 is held very firmly in place, and yet it turns easily and as the wheel hub is made fast to the spindle and cannot work loose, there is no need of washers in adjusting the wheel, and moreover, the construction of the chest is such that all dust and dirt are excluded from the bearing. This bearing may be very easily adjusted for either a new or an old axle, and by means of the wedge 29, the proper pitch of the wheel may be quickly obtained.

Having thus fully described my invention, I claim as new and desire to secure by Letters Patent—

1. An axle bearing, comprising a shaft chest adapted to be secured to an axle, the chest having means of supply at its upper side and a vent on its lower side, boxes held removably within the chest, a spindle held to turn in the boxes and having one end projecting from the chest, and a wheel having its hub made fast to the spindle, substantially as described.

2. An axle bearing, comprising a shaft chest adapted to be secured to an axle and having grooves near its opposite ends, boxes held in the grooves of the said chest, a spindle held to turn in the boxes and having one end projecting from the chest so as to carry a wheel, an oil cup held above the chest and having diverging tubes or pipes leading to boxes, and a vent opening from the lower portion of the chest, substantially as shown and described.

3. The combination of the main axle, the shaft chest having the wheel spindle journaled therein, a fastening device to secure the chest to the axle, and an adjusting wedge arranged between the chest and the main axle, substantially as described.

4. The combination of the main axle, the shaft chest carried beneath the main axle, the boxes held within the chest, the wheel spindle journaled in the boxes, and the clips for fastening the chest to the axle, the said clips having shoulders on their upper sides which extend inward above the boxes and chest, substantially as described.

WILLIAM D. T. TRAVIS.

Witnesses:
I. RUSSELL BATTEAL,
C. HOWELL SMITH.